United States Patent
Kita et al.

(10) Patent No.: US 12,286,554 B2
(45) Date of Patent: Apr. 29, 2025

(54) SELF-EMULSIFYING POLYISOCYANATE COMPOSITION, TWO-PACK TYPE COATING COMPOSITION AND COATING FILM

(71) Applicants: TOSOH CORPORATION, Shunan (JP); SAGAMI CHEMICAL RESEARCH INSTITUTE, Ayase (JP)

(72) Inventors: Motomu Kita, Yokkaichi (JP); Shimou Chinson, Ayase (JP); Munenori Inoue, Ayase (JP); Masahiro Nagaoka, Ayase (JP); Hiroaki Adachi, Ayase (JP); Aki Maeda, Ayase (JP)

(73) Assignees: TOSOH CORPORATION, Shunan (JP); SAGAMI CHEMICAL RESEARCH INSTITUTE, Ayase (JP)

( * ) Notice: Subject to any disclaimer, the term of this patent is extended or adjusted under 35 U.S.C. 154(b) by 670 days.

(21) Appl. No.: 17/595,828

(22) PCT Filed: May 22, 2020

(86) PCT No.: PCT/JP2020/020255
§ 371 (c)(1),
(2) Date: Nov. 24, 2021

(87) PCT Pub. No.: WO2020/241479
PCT Pub. Date: Dec. 3, 2020

(65) Prior Publication Data
US 2022/0228026 A1 Jul. 21, 2022

(30) Foreign Application Priority Data

May 29, 2019 (JP) .................... 2019-099975
Sep. 20, 2019 (JP) .................... 2019-170969

(51) Int. Cl.
| C09D 175/12 | (2006.01) |
| C08G 18/08 | (2006.01) |
| C08G 18/32 | (2006.01) |
| C08G 18/38 | (2006.01) |
| C08G 18/70 | (2006.01) |
| C08G 18/79 | (2006.01) |
| C09D 5/02 | (2006.01) |
| C09D 175/04 | (2006.01) |

(52) U.S. Cl.
CPC ....... *C09D 175/12* (2013.01); *C08G 18/0828* (2013.01); *C08G 18/3206* (2013.01); *C08G 18/3857* (2013.01); *C08G 18/706* (2013.01); *C08G 18/791* (2013.01); *C09D 5/02* (2013.01); *C09D 175/04* (2013.01)

(58) Field of Classification Search
CPC .. C09D 175/12; C09D 175/04; C09D 175/02; C08G 18/0828; C08G 18/3206; C08G 18/3857; C08G 18/706; C08G 18/791
USPC ........................................ 524/591
See application file for complete search history.

(56) References Cited

U.S. PATENT DOCUMENTS

| 4,522,851 A | 6/1985 | Rosthauser |
| 4,757,105 A | 7/1988 | Kopp et al. |
| 2015/0147577 A1 | 5/2015 | Shigemori et al. |
| 2019/0330409 A1* | 10/2019 | Laas ............... C08G 18/8083 |

FOREIGN PATENT DOCUMENTS

| CN | 1429240 A | 7/2003 |
| CN | 104448232 A | 3/2015 |
| CN | 109824555 A | 5/2019 |
| EP | 0310345 A1 | 4/1989 |
| EP | 3560974 A1 | 10/2019 |
| JP | S61-291613 A | 12/1986 |
| JP | H7-048429 A | 2/1995 |
| JP | 2003-533566 A | 11/2003 |
| JP | 2013-193986 A | 9/2013 |
| JP | 2018-119107 A | 8/2018 |
| JP | 2018-532830 A | 11/2018 |
| JP | 2019-214701 A | 12/2019 |
| JP | 2021-521294 A | 8/2021 |
| WO | WO 2001/088006 A1 | 11/2001 |
| WO | WO 2017/042111 A1 | 3/2017 |
| WO | WO 2018/070371 A1 | 4/2018 |
| WO | WO 2019/206861 A1 | 10/2019 |

OTHER PUBLICATIONS

International Search Report and Written Opinion for PCT Application No. PCT/JP2020/020255, with translation, dated Aug. 4, 2020, 6 pages.
International Preliminary Report on Patentability for PCT Application No. PCT/JP2020/020255 dated Dec. 9, 2021, 5 pages.
EPO Communication dated Dec. 19, 2022 forwarding the extended European Search Report for European Patent Application No. 20814685.2, 7 pages.

* cited by examiner

*Primary Examiner* — Ruiyun Zhang
(74) *Attorney, Agent, or Firm* — Squire Patton Boggs (US) LLP

(57) ABSTRACT

The present invention relates to a self-emulsifying polyisocyanate composition including a reaction mixture of (a) an anionic compound having a specific structure, (b) nonionic hydrophilic group-containing monofunctional alcohol having a specific structure, (c) organic polyisocyanate, and (d) tertiary amine, a two-part coating composition that contains the composition, and a coating film that can be obtained from the coating composition.

11 Claims, No Drawings

SELF-EMULSIFYING POLYISOCYANATE COMPOSITION, TWO-PACK TYPE COATING COMPOSITION AND COATING FILM

CROSS-REFERENCE TO RELATED APPLICATIONS

This application is a National Stage filing under 35 U.S.C. § 371 of International Patent Application No. PCT/JP2020/020255, filed May 22, 2020, which claims the benefit of priority to JP Application No. 2019-170969, filed Sep. 20, 2019, and further claims the benefit of priority to JP Application No. 2019-099975, filed May 29, 2019, these applications are incorporated herein by reference in their entirety for all purposes.

TECHNICAL FIELD

The present invention relates to a self-emulsifying polyisocyanate composition, a two-part coating composition, and a coating film.

BACKGROUND ART

Conventionally, polyisocyanate is known as a curable composition that is used as an adhesive agent, a coating material, or the like. Hydrophobic polyisocyanate with an isocyanurate structure is used by being modified with a nonionic hydrophilic group-containing monofunctional alcohol compound, and emulsified and dispersed in water (for example, refer to Patent Literature 1). In such a composition, when the polyisocyanate is dispersed in an aqueous medium at a temperature higher than or equal to a clouding point of the nonionic hydrophilic group-containing monofunctional alcohol, there is a problem that dispersion particles become large, and dispersion stability decreases.

Therefore, self-emulsifying polyisocyanate having no temperature dependency on a dispersion particle diameter (hereinafter, referred to as a "particle diameter") at water dispersion is found by modifying the polyisocyanate with anionic hydrophilic group-containing amine instead of the nonionic hydrophilic group-containing monofunctional alcohol (for example, refer to Patent Literature 2). However, even in such a case, there is a problem that the particle diameter of the obtained self-emulsifying polyisocyanate is large, and the water-dispersed self-emulsifying polyisocyanate component is precipitated.

CITATION LIST

Patent Literature

Patent Literature 1: Japanese Unexamined Patent Publication No. S61-291613
Patent Literature 2: Japanese Unexamined Patent Publication No. 2003-533566

SUMMARY OF INVENTION

Technical Problem

An object of the present invention is to provide a self-emulsifying polyisocyanate composition in which a change in a particle diameter due to temperature dependence is small, and dispersion stability is excellent.

Solution to Problem

The present invention provides a self-emulsifying polyisocyanate composition, including: a reaction mixture of (a) an anionic compound, (b) a nonionic hydrophilic group-containing monofunctional alcohol, (c) an organic polyisocyanate, and (d) a tertiary amine,
  in which the reaction mixture includes polyisocyanate having a urethane bond and a urea bond, and
  (a) the anionic compound is represented by Formula 1 described below, a content of a sulfo group in the composition is 0.05 mmol/g or more and 0.10 mmol/g or less, (b) the nonionic hydrophilic group-containing monofunctional alcohol is represented by Formula 2 described below, and a content of (b) the nonionic hydrophilic group-containing monofunctional alcohol in the composition is 2 to 10 mass %. Hereinafter, (a) the anionic compound may be abbreviated as the "component (a)". In addition, the other components may be similarly abbreviated.

[Chemical Formula 1]

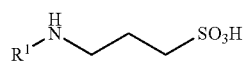

(Formula 1)

(In the formula, $R^1$ indicates a straight-chain alkyl group having 3 to 6 carbon atoms, or an alkyloxy-containing group having a structure in which oxygen atoms are inserted between carbon atoms of an alkyl group having 3 to 6 carbon atoms not to be adjacent to each other.)

[Chemical Formula 2]

(Formula 2)

(In the formula, $R^2$ indicates an alkyl group having 1 to 4 carbon atoms. n indicates an integer of 5 to 30.)

The self-emulsifying polyisocyanate composition is obtained from the component (a), the component (b), the component (c), and the component (d). That is, the self-emulsifying polyisocyanate composition includes the reaction mixture of the component (a), the component (b), the component (c), and the component (d), and the reaction mixture includes the polyisocyanate having a urethane bond and a urea bond. In such components, the components that are not involved in the reaction may be contained in an unreacted state.

It is considered that the generation of the polyisocyanate having a urethane bond and a urea bond, for example, includes a reaction process as described below. That is, a neutralization reaction between the component (a) and the component (d) occurs, and a secondary amino group in the component (a) is ready to react with an isocyanate group in the component (c) (a neutralization reaction). In addition, the component (b) reacts with the component (c) to form a urethane bond (a urethanization reaction). Note that, the content of the component (b) is in a range of 2 to 10 mass % such that the isocyanate group of the component (c) is not completely consumed even after the urethanization reaction. It is conjectured that the neutralization reaction and the urethanization reaction approximately simultaneously occur.

Then, a secondary amino group of a reactant generated in the neutralization reaction reacts with the isocyanate group of the component (c) to form a urea bond (a ureaization reaction). The content of the sulfo group in the component (a) is 0.05 mmol/g or more and 0.10 mmol/g or less such that the isocyanate group of the component (c) is not completely consumed even after the ureaization reaction. According to the reactions described above, the component (b) is bonded to the component (c) via the urethane bond, and the component (a) (or the component (a) and the component (d)) is further bonded to the component (c) via the urea bond, and unreacted isocyanate groups are retained in the component (c). Note that, the reaction modes described above are merely an example, and the orders or mechanisms of the reactions may be different. In addition, the unreacted component may remain, but it is preferable that all of the component (a), the component (b), the component (c), and the component (d) are involved in the reactions.

The self-emulsifying polyisocyanate composition described above has an effect that a change in a particle diameter due to temperature dependence is small, and dispersion stability is excellent.

The excellence of the dispersion stability can be evaluated by a particle diameter at the time of dispersing the self-emulsifying polyisocyanate composition in water. For example, in a case where an average particle diameter at 25° C. according to a dynamic light scattering method is 230 nm or less by the water dispersion, it can be determined that the dispersion stability is excellent. In addition, in a case where a difference between the average particle diameters at 25° C. and 40° C. according to the dynamic light scattering method is 10 nm or less, it can be said that a change in the particle diameter due to temperature dependence is small.

In a case where the self-emulsifying polyisocyanate composition does not contain any of the components (a) to (d), at least one of the dispersion stability and particle diameter stability (indicating that the particle diameter is not changed in a manner that depends on a temperature) cannot be attained. For example, in a case where the component (a) and the component (d) do not coexist, a phenomenon may occur in which the average particle diameter at 25° C. after the water dispersion increases, the dispersion stability is insufficient, a difference between the average particle diameters at 25° C. and 40° C. also increases, and the particle diameter is changed in a manner that depends on a temperature. In addition, in a case where component (b) does not exist, a phenomenon may occur in which the average particle diameter at 25° C. after the water dispersion does not sufficiently decrease, and a difference between the average particle diameters at 25° C. and 40° C. increases. Then, in a case where $R^1$ in the component (a) is not the straight-chain alkyl group having 3 to 6 carbon atoms, or the alkyloxy-containing group described above, a phenomenon may occur in which a difference between the average particle diameters at 25° C. and 40° C. also increases, and the particle diameter stability is insufficient.

The content of (b) the nonionic hydrophilic group-containing monofunctional alcohol in the composition can also be 3 to 10 mass %. Accordingly, the dispersion stability and the particle diameter stability become excellent.

As the component (c), organic polyisocyanate in which the content of an isocyanate group is 10 to 35 mass % can be adopted. In addition, since the effect of the present invention can be more remarkable, it is preferable that the component (c) contains at least one of isocyanurate-modified polyisocyanate of hexamethylene diisocyanate and allophanate-modified polyisocyanate of hexamethylene diisocyanate.

Examples of $R^1$ in the component (a) include a propyl group, a butyl group, a 3-methoxypropyl group, a 4-methoxybutyl group, a 3-ethoxypropyl group, or a 4-ethoxybutyl group, and a propyl group, a butyl group, or a 3-methoxypropyl group is preferable.

It is preferable that $R^2$ in the component (b) is an alkyl group having 1 to 2 carbon atoms, and n is an integer of 8 to 20. Accordingly, both of the dispersion stability and the particle diameter stability become more excellent.

It is preferable that a ratio of the component (d) to the component (a) is 0.8 to 1.2 in terms of molar equivalent ratio. That is, Equivalent of (d) Tertiary Amine:Equivalent of (a) Anionic Compound may be 0.8:1 to 1.2:1. As described above, it is considered that the component (a) and the component (d) cause a neutralization reaction, and since there is no excess or deficiency in the neutralization reaction by setting the molar equivalent ratio to be in the range described above, the reactivity of the secondary amino group in the component (a) with respect to the isocyanate group, based on the neutralization reaction, is improved.

In addition, the present invention provides a two-part coating composition, including the self-emulsifying polyisocyanate composition; a base compound; and an aqueous medium. Here, the aqueous medium indicates a medium containing only water, or a medium in which a water-soluble, water-swellable, or water-dispersible component is added to water. The self-emulsifying polyisocyanate composition is dispersed in the aqueous medium of the two-part coating composition, and the base compound is dispersed in the aqueous medium, or dissolved or swelled by the aqueous medium.

The base compound may be an active hydrogen group-containing polymer compound, and a molar ratio of the isocyanate group of the polyisocyanate having a urethane bond and a urea bond in the self-emulsifying polyisocyanate composition and the active hydrogen group of the base compound may be 6:4 to 4:6. Since the base compound reacts with the self-emulsifying polyisocyanate composition to form a cross-linked structure by the base compound containing active hydrogen, the two-part coating composition forms a tough coating film that is excellent in heat resistance.

The base compound may be an active hydrogen group-free polymer compound, and a mass ratio of the polyisocyanate having a urethane bond and a urea bond in the self-emulsifying polyisocyanate composition and the base compound may be 1:9 to 3:7. In this case, the self-emulsifying polyisocyanate composition reacts with water to form a polyurea compound, and a hard and tough coating film is formed.

As described above, a coating film having various properties according to the purpose can be obtained from the two-part coating composition. Note that, the aqueous medium that is not involved in the reaction is removed by volatilization or the like.

Advantageous Effects of Invention

According to the present invention, it is possible to obtain a self-emulsifying polyisocyanate composition having excellent dispersion stability regardless of the outside air temperature.

DESCRIPTION OF EMBODIMENTS

Hereinafter, an embodiment of the present invention will be described in detail. However, the present invention is not limited to the following embodiment.

<(a) Anionic Compound>

The component (a) is a hydrophilizing agent for producing a self-emulsifying polyisocyanate composition, which is represented by Formula 1 described below and is capable of imparting hydrophilicity to a component (c).

[Chemical Formula 3]

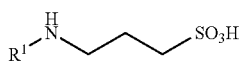

(Formula 1)

(In the formula, $R^1$ indicates a straight-chain alkyl group. In the group of $R^1$, one or more carbon atoms may be substituted with oxygen atoms such that the oxygen atoms are not adjacent to each other, and the total number of carbon atoms in $R^1$ is 3 or more and 6 or less. That is, $R^1$ indicates a straight-chain alkyl group having 3 to 6 carbon atoms, or an alkyloxy-containing group having a structure in which oxygen atoms are inserted between carbon atoms of an alkyl group having 3 to 6 carbon atoms not to be adjacent to each other.)

As the straight-chain alkyl group indicated by $R^1$, in which the total number of carbon atoms is 3 or more and 6 or less, for example, a propyl group, a butyl group, a pentyl group, and a hexyl group can be exemplified. Among them, an alkyl group in which the number of carbon atoms is 3 or more and 5 or less is preferable from the viewpoint of high compatibility with respect to water. Examples of such an alkyl group include a propyl group and a butyl group. Note that, since all of the alkyl groups described above are a straight-chain alkyl group, the propyl group indicates a n-propyl group, and the other functional groups are also a normal (n-) group.

$R^1$ may be a group in which the total number of carbon atoms is 3 or more and 6 or less, in which one or more carbon atoms of a straight-chain alkyl group may be substituted with oxygen atoms such that the oxygen atoms are not adjacent to each other. That is, $R^1$ may be an alkyloxy-containing group having a structure in which oxygen atoms are inserted between carbon atoms of an alkyl group having 3 to 6 carbon atoms not to be adjacent to each other. As the alkyloxy-containing group, a 2-methoxyethyl group, a 2-ethoxyethyl group, a 2-propoxyethyl group, a 2-butoxyethyl group, a 3-methoxypropyl group, a 3-ethoxypropyl group, a 3-propoxypropyl group, a 4-methoxybutyl group, a 4-ethoxybutyl group, a 2-(2-methoxyethoxy)ethyl group, a 2-(2-ethoxyethoxy)ethyl group, and the like can be exemplified. Among them, the 3-methoxypropyl group, the 4-methoxybutyl group, the 3-ethoxypropyl group, and the 4-ethoxybutyl group are preferable from the viewpoint of a low price and an excellent effect. In particular, the 3-methoxypropyl group is preferable.

Examples of the component (a) include 3-(propylamino) propane sulfonic acid, 3-(butylamino)propane sulfonic acid, 3-(pentylamino)propane sulfonic acid, 3-[(2-methoxyethyl) amino]propane sulfonic acid, 3-[(2-ethoxyethyl)amino]propane sulfonic acid, 3-[(3-methoxypropyl)amino]propane sulfonic acid, 3-[(3-ethoxypropyl)amino]propane sulfonic acid, 3-[(3-propoxypropyl)amino]propane sulfonic acid, 3-[(4-methoxybutyl)amino]propane sulfonic acid, 3-[(4-ethoxybutyl)amino]propane sulfonic acid, 3-[[2-(2-methoxyethoxy)ethyl]amino]propane sulfonic acid, 3-[[2-(2-ethoxyethoxy)ethyl]amino]propane sulfonic acid, 3-(hexylamino)propane sulfonic acid, and the like, it is preferable to use at least one type selected from the group consisting of the group above. It is further preferable to use at least one type selected from the group consisting of the 3-(propylamino)propane sulfonic acid, the 3-(butylamino) propane sulfonic acid, and the 3-[(3-methoxypropyl)amino] propane sulfonic acid, from the viewpoint of high compatibility with respect to water. The content of a sulfo group in the self-emulsifying polyisocyanate composition is 0.05 to 0.10 mmol/g. According to such a range, it is possible to obtain a coating material having a low viscosity and excellent water dispersibility.

Since in the component (a) represented by Formula 1, an internal salt represented by Formula 1a, having a structure in which active hydrogen of a sulfo group in the molecules is rearranged on an amino group in the molecules, can be formed, the component (a) contains the internal salt represented by Formula 1a. Herein, the component (a) is noted as Formula 1.

[Chemical Formula 4]

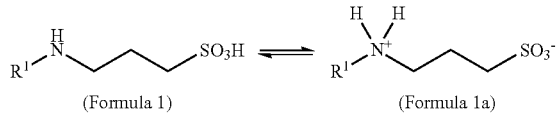

(Formula 1)   (Formula 1a)

(In the formula, $R^1$ indicates the same meaning as described above.)

The component (a) can be prepared with reference to a known method (for example, U.S. Unexamined Patent Application Publication No. 20070010573).

<(b) Nonionic Hydrophilic Group-Containing Monofunctional Alcohol>

The component (b) is alkoxypolyethylene glycol represented by Formula 2 described below. Note that, polyoxyalkylene glycol monoalkyl ether, polyoxyalkylene fatty ester monoalcohol, and the like, other than the alkoxypolyethylene glycol represented by Formula 2 described below, can be added within a range in which dispersion stability does not decrease.

[Chemical Formula 5]

(Formula 2)

(In the formula, $R^2$ indicates an alkyl group having 1 to 4 carbon atoms. n indicates an integer of 5 to 30.)

As the component (b), commercially available products can be used. In addition, the component (b) can also be used by being prepared from $R^2OH$ (in the formula, $R^2$ indicates the same meaning as described above) and ethylene oxide.

As the alkyl group having 1 to 4 carbon atoms, indicated by $R^2$, a methyl group, an ethyl group, a propyl group, a butyl group, an isopropyl group, an isobutyl group, a t-butyl group, and the like can be exemplified. As $R^2$, an alkyl group having 1 to 2 carbon atoms, that is, a methyl group and an ethyl group are preferable.

It is preferable to use the component (b) in which n is 8 to 20, from the viewpoint of high hydrophilicity. n may be 8 to 18, 8 to 16, or 8 to 12. The content of the component (b) in the self-emulsifying polyisocyanate composition is 2 to 10 mass %, or can be 3 to 10 mass %. According to such a range, it is possible to obtain a coating material having high coating film hardness.

Examples of the component (b) include methoxypolyethylene glycol, ethoxypolyethylene glycol, propoxypolyethylene glycol, and butoxypolyethylene glycol. Examples of the methoxypolyethylene glycol in which n of Formula 2 is 5 to 30 include methoxypolyethylene glycol in which an average molecular weight calculated from a hydroxyl value is 250, 300, 350, 400, 450, 500, 550, 600, 650, 700, 750, 800, 850, 900, 950, or 1000, or methoxypolyethylene glycol in a range including any of the average molecular weights described above as the upper limit and the lower limit.

<(c) Organic Polyisocyanate>

Examples of the component (c) include organic polyisocyanate selected from aromatic polyisocyanate, aromatic aliphatic polyisocyanate, aliphatic polyisocyanate, and alicyclic polyisocyanate. In addition, one type of isocyanurate-modified polyisocyanate, allophanate-modified polyisocyanate, uretdione-modified polyisocyanate, urethane-modified polyisocyanate, biuret-modified polyisocyanate, uretonimine-modified polyisocyanate, acyl urea-modified polyisocyanate, and the like of the organic polyisocyanates can be used, or two or more types thereof can be suitably used together. In addition, the aliphatic polyisocyanate, the alicyclic polyisocyanate, and modified polyisocyanates thereof are preferable in consideration of weather resistance, and it is preferable to use at least one type selected from the group consisting of the isocyanurate-modified polyisocyanate, the allophanate-modified polyisocyanate of the aliphatic polyisocyanate and the alicyclic polyisocyanate, from the viewpoint of the durability of a coated film and adhesion to a base material. In consideration of glossiness, it is preferable to use at least one type selected from the group consisting of the isocyanurate-modified polyisocyanate of the hexamethylene diisocyanate and the allophanate-modified polyisocyanate of the hexamethylene diisocyanate.

<Aromatic Polyisocyanate>

Examples of the aromatic polyisocyanate include 2,4-tolylene diisocyanate, 2,6-tolylene diisocyanate, a mixture of 2,4-tolylene diisocyanate/2,6-tolylene diisocyanate, 4,4'-diphenylmethane diisocyanate, 2,4'-diphenylmethane diisocyanate, a mixture of 2,4'-diphenylmethane diisocyanate/4,4'-diphenylmethane diisocyanate, m-xylylene diisocyanate, p-xylylene diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenyl methane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, and the like.

<Aromatic Aliphatic Polyisocyanate>

Examples of the aromatic aliphatic polyisocyanate include 1,3-xylylene diisocyanate, 1,4-xylylene diisocyanate, or a mixture thereof; 1,3-bis(1-isocyanato-1-methylethyl)benzene, 1,4-bis(1-isocyanato-1-methylethyl)benzene, or a mixture thereof; ω,ω'-diisocyanato-1,4-diethyl benzene, and the like.

<Aliphatic Polyisocyanate>

Examples of the aliphatic polyisocyanate include hexamethylene diisocyanate, tetramethylene diisocyanate, 2-methylpentane-1,5-diisocyanate, 3-methylpentane-1,5-diisocyanate, lysine diisocyanate, trioxyethylene diisocyanate, ethylene diisocyanate, trimethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanate-4-(isocyanatomethyl)octane, 2,5,7-trimethyl-1,8-diisocyanate-5-(isocyanatomethyl)octane, bis(isocyanatoethyl)carbonate, bis(isocyanatoethyl) ether, 1,4-butylene glycol dipropyl ether-α,α'-diisocyanate, lysine diisocyanate methyl ester, 2-isocyanatoethyl-2,6-diisocyanate hexanoate, 2-isocyanatopropyl-2,6-diisocyanate hexanoate, and the like.

<Alicyclic Polyisocyanate>

Examples of the alicyclic polyisocyanate include isophorone diisocyanate, cyclohexyl diisocyanate, bis(isocyanatomethyl)cyclohexane, dicyclohexylmethane diisocyanate, methylcyclohexane diisocyanate, dicyclohexyl dimethyl methane diisocyanate, 2,2'-dimethyl dicyclohexyl methane diisocyanate, bis(4-isocyanato-n-butylidene)pentaerythritol, hydrogenated dimer acid diisocyanate, 2-isocyanatomethyl-3-(3-isocyanatopropyl)-5-isocyanatomethyl-bicyclo[2.2.1]heptane, 2-isocyanatomethyl-3-(3-isocyanatopropyl)-6-isocyanato methylbicyclo[2.2.1]heptane, 2-isocyanatomethyl-2-(3-isocyanatopropyl)-5-isocyanatomethylbicyclo[2.2.1]heptane, 2-isocyanatomethyl-2-(3-isocyanatopropyl)-6-isocyanatomethylbicyclo[2.2.1]heptane, 2-isocyanatomethyl-3-(3-isocyanatopropyl)-5-(2-isocyanatoethyl)bicyclo[2.2.1]heptane, 2-isocyanatomethyl-3-(3-isocyanatopropyl)-6-(2-isocyanato ethyl)bicyclo[2.2.1]heptane, 2-isocyanatomethyl-2-(3-isocyanatopropyl)-5-(2-isocyanatoethyl)bicyclo[2.2.1]heptane, 2-isocyanatomethyl-2-(3-isocyanatopropyl)-6-(2-isocyanatoethyl)bicyclo[2.2.1]heptane, 2,5-bis(isocyanatomethyl)bicyclo[2.2.1]heptane, hydrogenated diphenylmethane diisocyanate subjected to hydrogenation, norbornane diisocyanate, hydrogenated tolylene diisocyanate subjected to hydrogenation, hydrogenated xylene diisocyanate subjected to hydrogenation, hydrogenated tetramethyl xylene diisocyanate subjected to hydrogenation, and the like.

In addition, the content of an isocyanate group in the component (c) is preferably 10 to 35 mass %, and more preferably 15 to 24 mass %, from the viewpoint of excellent dispersion stability.

<(d) Amine Compound>

The component (d) is tertiary amine. Examples of the tertiary amine include tertiary monoamine such as trimethylamine, triethylamine, tripropylamine, tributylamine, dimethylcyclohexylamine, N-methylmorpholine, N-ethylmorpholine, N-methylpiperidine, N-ethylpiperidine, dimethylethanolamine, methyldiethanolamine, and triethanolamine, and tertiary diamine such as 1,3-bis(dimethylamino)propane, 1,4-bis(dimethylamino)butane, and N,N'-dimethylpiperazine. In particular, the tertiary monoamine is preferable, and the tributylamine, the dimethylcyclohexylamine, and the N-methylmorpholine are more preferable, from the viewpoint of low reactivity with respect to isocyanate.

In addition, it is preferable to use the component (d) and the component (a) such that a molar equivalent ratio of the component (d) and the component (a) is 0.2:1 to 2:1, from the viewpoint of obtaining a coating material having a low viscosity, and the molar equivalent ratio is more preferably 0.5:1 to 1.5:1, and even more preferably 0.8:1 to 1.2:1. That is, the molar equivalent ratio of the component (d) to the component (a) [Equivalent of Component (d)/Equivalent of Component (a)] is preferably 0.2 to 1, more preferably 0.5 to 1.5, and even more preferably 0.8 to 1.2.

<Blending Method of Self-Emulsifying Polyisocyanate Composition>

In the production of the self-emulsifying polyisocyanate composition, a blending order of the component (a), the (b) component, the component (c), and the component (d) is not particularly limited, and a condition for a general urethanization reaction can be applied.

<Two-Part Coating Composition>

The two-part coating composition is obtained from the self-emulsifying polyisocyanate composition of the present invention and a base compound, and may contain the self-emulsifying polyisocyanate composition, the base compound, and an aqueous medium.

As the base compound of the two-part coating composition, a polymer compound that is a liquid at a normal temperature and is insoluble in water or has no affinity with respect to water can be preferably used. Note that, a water-soluble resin or aqueous emulsion, having solubility or a certain level of affinity with respect to water, can also be used. It is preferable that such a polymer compound has a hydroxyl group, a carboxyl group, or an amino group (hereinafter, referred to as an "active hydrogen group" or a "nucleophilic group"), which reacts with an isocyanate group, in the molecules, and in particular, it is preferable that the polymer compound has two or more active hydrogen groups in one molecule. In addition, even in a case where the polymer compound has no active hydrogen groups capable of reacting with the isocyanate group or has only a small amount of active hydrogen groups, finally, the self-emulsifying polyisocyanate composition reacts with water to form a polyurea compound, and a hard and tough coating film can be obtained. In addition, since the isocyanate group reacts with the active hydrogen group existing on the surface of an adherend, adhesion to the adherend is also improved. Note that, in a case of using the polymer compound having the active hydrogen group that is capable of reacting with the isocyanate group at a normal temperature, the active hydrogen group in the polymer compound reacts with the isocyanate group in the self-emulsifying polyisocyanate composition to form a cross-linked structure, and thus, weather resistance, solvent resistance, and the like are further improved. Note that, the normal temperature in the present invention is 5° C. to 40° C.

Examples of such a base compound include saturated or unsaturated polyester polyol, polycaprolactone polyol, saturated or unsaturated fatty acid-modified alkyd polyol, aminoalkyd polyol, polycarbonate polyol, acrylic polyol, polyether polyol, epoxy polyol, fluorine-containing polyol, and a saturated or unsaturated polyester resin, a polycaprolactone resin, a fatty acid-modified alkyd resin, an aminoalkyd resin, a polycarbonate resin, an acrylic resin, a polyether resin, an epoxy resin, a polyurethane resin, a cellulose acetate butyrate resin, a fluorine-containing resin, and the like.

In addition, the water-soluble resin and the aqueous emulsion can also be preferably used as the base compound, and examples of the water-soluble resin include polyvinyl alcohol, polyethylene oxide, a water-soluble ethylene-vinyl acetate copolymer, a water-soluble acrylic resin, a water-soluble epoxy resin, a water-soluble cellulose derivative, a water-soluble polyester, a water-soluble lignin derivative, a water-soluble fluorine resin, a water-soluble silicone resin, and the like.

As the aqueous emulsion, all materials expressed as so-called latex or emulsion are included, and examples thereof include rubber-based latex such as styrene butadiene copolymer latex, acrylonitrile butadiene copolymer latex, methyl methacrylate butadiene copolymer latex, chloroprene latex, and polybutadiene latex, polyacrylic ester latex, polyvinylidene chloride latex, polybutadiene latex, or carboxyl-modified latex thereof, and polyvinyl chloride emulsion, urethane acrylic emulsion, silicone acrylic emulsion, vinyl acetate acrylic emulsion, polyurethane emulsion, acrylic emulsion, and the like.

Among them, the acrylic polyol, the acrylic resin, the water-soluble acrylic resin, the acrylic emulsion, the urethane acrylic emulsion, and the polyurethane emulsion are particularly preferable from the viewpoint of coating film performance such as gloss or weather resistance, or adhesive strength.

A number average molecular weight of the polymer compound as the base compound is preferably 1000 to 1000000, and more preferably 10000 to 100000.

<Blending Ratio>

For a blending ratio of the self-emulsifying polyisocyanate composition and the base compound in the production of the coating composition of the present invention, in a case of using a compound having an active hydrogen group in the molecules, as the base compound of the present invention, a molar ratio of the isocyanate group in the self-emulsifying polyisocyanate composition and the active hydrogen group in the base compound is preferably 9:1 to 1:9, and more preferably 6:4 to 4:6. According to such a range, it is possible to obtain a coating film having more excellent performance.

In addition, in a case of using a compound having no or only a small amount of active hydrogen groups in the molecules, as the base compound, the mass ratio of the self-emulsifying polyisocyanate composition and the base compound is preferably 1:9 to 5:5, and more preferably 1:9 to 3:7. According to such a range, it is possible to obtain a coating film having more excellent performance.

<Blending Method>

Examples of a blending method of the base compound and the self-emulsifying polyisocyanate composition include methods such as directly adding the self-emulsifying polyisocyanate composition to the base compound, adding the self-emulsifying polyisocyanate composition after once dispersing (or water-dispersing) the self-emulsifying polyisocyanate composition in the aqueous medium, or adding the self-emulsifying polyisocyanate composition after dissolving the self-emulsifying polyisocyanate composition in a solvent that is generally used in the field of urethane. In the present invention, a method of blending the self-emulsifying polyisocyanate composition with the base compound after dispersing (or water-dispersing) the self-emulsifying polyisocyanate composition in the aqueous medium is preferable.

<Other Additives>

In the self-emulsifying polyisocyanate composition or the two-part coating composition, as necessary, for example, additives that are generally used by a person skilled in the art, such as an antioxidant, an ultraviolet absorber, a pigment, a colorant, a flame retardant, a hydrolysis inhibitor, a lubricant, a plasticizer, a filler, a storage stabilizer, and a film forming aid, can be suitably blended.

<Coating Method>

A coating film can be obtained by coating the two-part coating composition, according to a general coating method of the related art. In the coating, an airless sprayer, an air sprayer, an electrostatic coater, immersion, a roll coater, a knife coater, a brush, and the like can be used.

EXAMPLES

Hereinafter, the present invention will be described in more detail by Examples, but the present invention is not limitedly interpreted by Examples.

[Production of Anionic Compound]

Synthesis Example 1

In a flask of 200 mL to which a reflux pipe was attached, 1,3-propane sultone (6.02 g, 49.1 mmol) and propylamine (4.00 mL, 48.5 mmol) were weighed and dissolved in tetrahydrofuran (44 mL). A resulting solution was refluxed for 11 hours in an argon atmosphere, and then, a volatile component was removed. A solid, which was obtained, was recrystallized from ethanol, and a white precipitate, which was deposited, was filtered and washed with tetrahydrofuran, and then, dried at 60° C. under a reduced pressure to obtain a 3-(propylamino)propane sulfonic acid (A-1) (4.55 g, 25.1 mmol, 51%). $^1$H NMR (400 MHz, DMSO-d6) δ(ppm): 8.48 (br, 2H), 3.05 (t, J=6.7 Hz, 2H), 2.84 (m, 2H), 2.62 (m, 2H), 1.93 (tt, J=6.5, 6.7 Hz, 2H), 1.57 (tq, J=7.7, 7.5 Hz, 2H), 0.91 (t, J=7.5 Hz, 3H).

Synthesis Example 2

1,3-propane sultone (6.72 g, 55.0 mmol), butylamine (11.0 mL, 111 mmol), and tetrahydrofuran (60 mL) were added to a flask of 200 mL to which a reflux pipe was attached, and a 3-(butylamino)propane sulfonic acid (A-2) (5.20 g, 26.6 mmol, 48%) was obtained by the same method as that in Synthesis Example 1. $^1$H NMR (400 MHz, DMSO-d6) δ (ppm): 8.49 (brs, 2H), 3.04 (t, J=6.4 Hz, 2H), 2.87 (m, 2H), 2.62 (m, 2H), 1.92 (m, 2H), 1.52 (m, 2H), 1.32 (m, 2H), 0.89 (t, J=7.4 Hz, 3H).

Synthesis Example 3

1,3-propane sultone (10.1 g, 83 mmol), (3-methoxypropyl)amine (12.6 mL, 120 mmol), and tetrahydrofuran (60 mL) were added to a flask of 200 mL to which a reflux pipe was attached, and a 3-[(3-methoxypropyl)amino]propane sulfonic acid (A-3) (8.82 g, 42 mmol) was obtained by the same method as that in Synthesis Example 1. $^1$H NMR (400 MHz, DMSO-d$_6$) δ (ppm): 8.48 (br, 2H), 3.38 (t, J=6.0 Hz, 2H), 3.24 (s, 3H), 3.04 (m, 2H), 2.93 (m, 2H), 2.61 (m, 2H), 1.92 (m, 2H), 1.79 (m, 2H).

[Production of Self-Emulsifying Polyisocyanate]

Example 1

476.5 g of organic polyisocyanate (isocyanurate-containing polyisocyanate of hexamethylene diisocyanate, Product Name: Coronate HXLV, the content of an isocyanate group of 23.2 mass %, manufactured by TOSOH CORPORATION), 5.3 g of A-1 obtained in Synthesis Example 1, 15.0 g of methoxyPEG (methoxypolyethylene glycol, a molecular weight of 400, manufactured by TOHO Chemical Industry Co., Ltd), and 3.2 g of dimethylcyclohexylamine were put in a reactor having capacity of 0.5 L, provided with a stirrer, a thermometer, a cooler, and a nitrogen gas introduction pipe, and stirred at 80° C. for 5 hours to obtain self-emulsifying polyisocyanate P-1. The content of a sulfo group in P-1 was 0.05 mmol/g, the content of nonionic hydrophilic group-containing monofunctional alcohol was 3.0 mass %, and the content of an isocyanate group was 21.6 mass %.

Self-emulsifying polyisocyanates P-2 to 21 were synthesized by the same method as that in Example 1. Results are shown in Tables 1 to 3.

TABLE 1

| | Example 2 | Example 3 | Example 4 | Example 5 | Example 6 | Example 7 |
|---|---|---|---|---|---|---|
| Self-emulsifying polyisocyanate | P-2 | P-3 | P-4 | P-5 | P-6 | P-7 |
| Coronate HXLV (g) | 466.5 | 456.5 | 468.0 | 458.0 | 448.0 | 433.0 |
| Methoxy PEG (g) | 25.0 | 35.0 | 15.0 | 25.0 | 35.0 | 50.0 |
| A-1 (g) (molecular weight: 181.25) | 5.3 | 5.3 | 10.6 | 10.6 | 10.6 | 10.6 |
| A-2 (g) (molecular weight: 195.28) | | | | | | |
| A-3 (g) (molecular weight: 211.28) | | | | | | |
| CAPS (g) | | | | | | |
| Dimethyl cyclohexyl amine (g) (molecular weight: 127.23) | 3.2 | 3.2 | 6.4 | 6.4 | 6.4 | 6.4 |
| Total (g) | 500.0 | 500.0 | 500.0 | 500.0 | 500.0 | 500.0 |
| Content of isocyanate (mass %) | 20.9 | 20.3 | 20.8 | 20.2 | 19.5 | 18.6 |
| Content of nonionic hydrophilic group-containing monofunctional alcohol (mass %) | 5.0 | 7.0 | 3.0 | 5.0 | 7.0 | 10.0 |
| Content of sulfo group (mmol/g) | 0.05 | 0.05 | 0.10 | 0.10 | 0.10 | 0.10 |
| A-1:dimethyl cyclohexyl amine (equivalent ratio) | 0.86:1 | 0.86:1 | 0.86:1 | 0.86:1 | 0.86:1 | 0.86:1 |

TABLE 2

| | Example 8 | Example 9 | Example 10 | Example 11 | Example 12 | Example 13 | Example 14 |
|---|---|---|---|---|---|---|---|
| Self-emulsifying polyisocyanate | P-8 | P-9 | P-10 | P-11 | P-12 | P-13 | P-14 |
| Coronate HXLV (g) | 476.5 | 466.5 | 456.5 | 468.0 | 458.0 | 448.0 | 433.0 |
| Methoxy PEG (g) | 15.0 | 25.0 | 35.0 | 15.0 | 25.0 | 35.0 | 50.0 |
| A-1 (g) (molecular weight: 181.25) | | | | | | | |
| A-2 (g) (molecular weight: 195.28) | 5.3 | 5.3 | 5.3 | 10.6 | 10.6 | 10.6 | 10.6 |
| A-3 (g) (molecular weight: 211.28) | | | | | | | |
| CAPS (g) | | | | | | | |
| Dimethyl cyclohexyl amine (g) (molecular weight: 127.23) | 3.2 | 3.2 | 3.2 | 6.4 | 6.4 | 6.4 | 6.4 |
| Total (g) | 500.0 | 500.0 | 500.0 | 500.0 | 500.0 | 500.0 | 500.0 |

TABLE 2-continued

|  | Example 8 | Example 9 | Example 10 | Example 11 | Example 12 | Example 13 | Example 14 |
| --- | --- | --- | --- | --- | --- | --- | --- |
| Content of isocyanate (mass %) | 21.6 | 20.9 | 20.3 | 20.8 | 20.2 | 19.5 | 18.6 |
| Content of nonionic hydrophilic group-containing monofunctional alcohol (mass %) | 3.0 | 5.0 | 7.0 | 3.0 | 5.0 | 7.0 | 10.0 |
| Content of sulfo group (mmol/g) | 0.05 | 0.05 | 0.05 | 0.10 | 0.10 | 0.10 | 0.10 |
| A-2:dimethyl cyclohexyl amine (equivalent ratio) | 0.93:1 | 0.93:1 | 0.93:1 | 0.93:1 | 0.93:1 | 0.93:1 | 0.93:1 |

TABLE 3

|  | Example 15 | Example 16 | Example 17 | Example 18 | Example 19 | Example 20 | Example 21 |
| --- | --- | --- | --- | --- | --- | --- | --- |
| Self-emulsifying polyisocyanate | P-15 | P-16 | P-17 | P-18 | P-19 | P-20 | P-21 |
| Coronate HXLV (g) | 476.5 | 466.5 | 456.5 | 468.0 | 458.0 | 448.0 | 433.0 |
| Methoxy PEG (g) | 15.0 | 25.0 | 35.0 | 15.0 | 25.0 | 35.0 | 50.0 |
| A-1 (g) (molecular weight: 181.25) |  |  |  |  |  |  |  |
| A-2 (g) (molecular weight: 195.28) |  |  |  |  |  |  |  |
| A-3 (g) (molecular weight: 211.28) | 5.3 | 5.3 | 5.3 | 10.6 | 10.6 | 10.6 | 10.6 |
| CAPS (g) |  |  |  |  |  |  |  |
| Dimethyl cyclohexyl amine (g) (molecular weight: 127.23) | 3.2 | 3.2 | 3.2 | 6.4 | 6.4 | 6.4 | 6.4 |
| Total (g) | 500.0 | 500.0 | 500.0 | 500.0 | 500.0 | 500.0 | 500.0 |
| Content of isocyanate (mass %) | 21.6 | 20.9 | 20.3 | 20.8 | 20.2 | 19.5 | 18.6 |
| Content of nonionic hydrophilic group-containing monofunctional alcohol (mass %) | 3.0 | 5.0 | 7.0 | 3.0 | 5.0 | 7.0 | 10.0 |
| Content of sulfo group (mmol/g) | 0.05 | 0.05 | 0.05 | 0.10 | 0.10 | 0.10 | 0.10 |
| A-3:dimethyl cyclohexyl amine (equivalent ratio) | 1:1 | 1:1 | 1:1 | 1:1 | 1:1 | 1:1 | 1:1 |

Example 22

476.5 g of organic polyisocyanate (allophanate-containing polyisocyanate of hexamethylene diisocyanate, Product Name: Coronate 2785, the content of an isocyanate group of 19.2 mass %, manufactured by TOSOH CORPORATION), 5.3 g of A-3 obtained in Synthesis Example 1, 15.0 g of methoxyPEG (methoxypolyethylene glycol, a molecular weight of 400, manufactured by TOHO Chemical Industry Co., Ltd), and 3.2 g of dimethyl cyclohexyl amine were put in a reactor having capacity of 0.5 L, provided with a stirrer, a thermometer, a cooler, and a nitrogen gas introduction pipe, and stirred at 80° C. for 5 hours to obtain self-emulsifying polyisocyanate P-22. The content of a sulfo group in P-22 was 0.05 mmol/g, the content of nonionic hydrophilic group-containing monofunctional alcohol was 3 mass %, and the content of an isocyanate group was 17.6 mass %.

Self-emulsifying polyisocyanates P-23 to 28 were synthesized by the same method as that in Example 1. Results are shown in Table 4.

TABLE 4

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Self-emulsifying polyisocyanate | P-23 | P-24 | P-25 | P-26 | P-27 | P-28 |
| Coronate HXLV (g) | 465.0 | 450.0 | 435.0 | 483.0 | 468.0 | 458.0 |
| Methoxy PEG (g) | 35.0 | 50.0 | 65.0 |  | 15.0 | 25.0 |
| A-1 (g) |  |  |  |  |  |  |
| A-2 (g) |  |  |  |  |  |  |
| A-3 (g) |  |  |  | 10.6 |  |  |
| CAPS (g) |  |  |  |  | 10.6 | 10.6 |
| Dimethyl cyclohexyl amine (g) |  |  |  | 6.4 | 6.4 | 6.4 |
| Total (g) | 500.0 | 500.0 | 500.0 | 500.0 | 500.0 | 500.0 |
| Content of isocyanate (mass %) | 20.8 | 19.8 | 18.8 | 22.0 | 20.8 | 20.2 |
| Content of nonionic hydrophilic group-containing monofunctional alcohol (mass %) | 7.0 | 10.0 | 13.0 | 0 | 3.0 | 5.0 |

TABLE 4-continued

|  | Comparative Example 1 | Comparative Example 2 | Comparative Example 3 | Comparative Example 4 | Comparative Example 5 | Comparative Example 6 |
|---|---|---|---|---|---|---|
| Content of sulfo group (mmol/g) | 0 | 0 | 0 | 0.10 | 0.10 | 0.10 |

CAPS: 3-(cyclohexylamino)propane sulfonic acid, manufactured by Tokyo Chemical Industry Co., Ltd.
MethoxyPEG: methoxypolyethylene glycol, a molecular weight of 400, manufactured by TOHO Chemical Industry Co., Ltd
Dimethylcyclohexylamine: special grade chemicals, manufactured by Tokyo Chemical Industry Co., Ltd.

<Particle Diameter Evaluation>

Each of the self-emulsifying polyisocyanate compositions (P-1 to 14) and purified water were mixed at a mass ratio of 1:9 in a sample bottle of 30 ml, and shaken up and down by hand for 20 seconds (60 times). A particle diameter (an average particle diameter according to a dynamic light scattering method) of a dispersion element of water dispersion, which was obtained, was evaluated with a particle diameter measurement device (Otsuka Electronics ELSZ-200). Results are shown in Tables 5 to 8. In a case where the particle diameter is 230 nm or less, it can be said that dispersion stability is excellent. In addition, in a case where a particle diameter difference between measurement at 25° C. and measurement at 40° C. is 10 nm or less, it can be said that dispersion stability is excellent regardless of the outside air temperature.

TABLE 5

|  | Example 23 | Example 24 | Example 25 | Example 26 | Example 27 | Example 28 | Example 29 |
|---|---|---|---|---|---|---|---|
| Self-emulsifying polyisocyanate | P-1 | P-2 | P-3 | P-4 | P-5 | P-6 | P-7 |
| 25° C. particle diameter (nm) | 223 | 200 | 165 | 156 | 135 | 109 | 80 |
| 40° C. particle diameter (nm) | 228 | 206 | 166 | 160 | 138 | 111 | 85 |
| Particle diameter difference (nm) | 5 | 6 | 1 | 4 | 3 | 2 | 5 |

TABLE 6

|  | Example 30 | Example 31 | Example 32 | Example 33 | Example 34 | Example 35 | Example 36 |
|---|---|---|---|---|---|---|---|
| Self-emulsifying polyisocyanate | P-8 | P-9 | P-10 | P-11 | P-12 | P-13 | P-14 |
| 25° C. particle diameter (nm) | 220 | 199 | 167 | 158 | 130 | 110 | 87 |
| 40° C. particle diameter (nm) | 226 | 207 | 170 | 160 | 137 | 113 | 89 |
| Particle diameter difference (nm) | 6 | 8 | 3 | 2 | 7 | 3 | 2 |

TABLE 7

|  | Example 37 | Example 38 | Example 39 | Example 40 | Example 41 | Example 42 | Example 43 |
|---|---|---|---|---|---|---|---|
| Self-emulsifying polyisocyanate | P-15 | P-16 | P-17 | P-18 | P-19 | P-20 | P-21 |
| 25° C. particle diameter (nm) | 224 | 202 | 161 | 158 | 134 | 112 | 84 |
| 40° C. particle diameter (nm) | 227 | 203 | 169 | 159 | 138 | 113 | 89 |
| Particle diameter difference (nm) | 3 | 1 | 8 | 1 | 4 | 1 | 5 |

TABLE 8

| | Example 44 | Comparative Example 7 | Comparative Example 8 | Comparative Example 9 | Comparative Example 10 | Comparative Example 11 | Comparative Example 12 |
|---|---|---|---|---|---|---|---|
| Self-emulsifying polyisocyanate | P-22 | P-23 | P-24 | P-25 | P-26 | P-27 | P-28 |
| 25° C. particle diameter (nm) | 198 | 572 | 504 | 200 | 223 | 176 | 148 |
| 40° C. particle diameter (nm) | 203 | 996 | 914 | 341 | 238 | 198 | 166 |
| Particle diameter difference (nm) | 5 | 424 | 410 | 141 | 15 | 22 | 18 |

The invention claimed is:

1. A self-emulsifying polyisocyanate composition, comprising:

a reaction mixture of (a) an anionic compound, (b) a nonionic hydrophilic group-containing monofunctional alcohol, (c) an organic polyisocyanate, and (d) a tertiary amine, wherein the reaction mixture comprises polyisocyanate having a urethane bond and a urea bond, and (a) the anionic compound is represented by Formula 1 described below, a content of a sulfo group in the composition is 0.05 mmol/g or more and 0.10 mmol/g or less, (b) the nonionic hydrophilic group-containing monofunctional alcohol is represented by Formula 2 described below, and a content of (b) the nonionic hydrophilic group-containing monofunctional alcohol in the composition is 2 to 10 mass %,

[Chemical Formula 1]

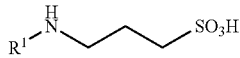

(Formula 1)

in the formula, $R^1$ indicates an alkyloxy-containing group having a structure in which oxygen atoms are inserted between carbon atoms of an alkyl group having 3 to 6 carbon atoms not to be adjacent to each other, and

[Chemical Formula 2]

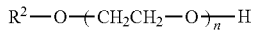

(Formula 2)

$R^2-O-(CH_2CH_2-O)_n-H$ in the formula, $R^2$ indicates an alkyl group having 1 to 4 carbon atoms, and n indicates an integer of 5 to 30.

2. The self-emulsifying polyisocyanate composition according to claim 1, wherein the content of (b) the nonionic hydrophilic group-containing monofunctional alcohol in the composition is 3 to 10 mass %.

3. The self-emulsifying polyisocyanate composition according to claim 1, wherein a content of an isocyanate group in (c) the organic polyisocyanate is 10 to 35 mass %.

4. The self-emulsifying polyisocyanate composition according to claim 1, wherein (c) the organic polyisocyanate comprises isocyanurate-modified polyisocyanate of hexamethylene diisocyanate and/or allophanate-modified polyisocyanate of hexamethylene diisocyanate.

5. The self-emulsifying polyisocyanate composition according to claim 1, wherein $R^1$ is a 3-methoxypropyl group, a 4-methoxybutyl group, a 3-ethoxypropyl group, or a 4-ethoxybutyl group.

6. The self-emulsifying polyisocyanate composition according to claim 1, wherein $R^2$ is an alkyl group having 1 to 2 carbon atoms, and n is an integer of 8 to 20.

7. The self-emulsifying polyisocyanate composition according to claim 1, wherein a ratio of (d) the tertiary amine to (a) the anionic compound is 0.8 to 1.2 in terms of a molar equivalent ratio.

8. A two-part coating composition, comprising:

the self-emulsifying polyisocyanate composition according to claim 1;

a base compound; and an aqueous medium.

9. The two-part coating composition according to claim 8, wherein the base compound is an active hydrogen group-containing polymer compound, and a molar ratio of the isocyanate group of the polyisocyanate having a urethane bond and a urea bond in the self-emulsifying polyisocyanate composition and the active hydrogen group of the base compound is 6:4 to 4:6.

10. The two-part coating composition according to claim 8, wherein the base compound is an active hydrogen group-free polymer compound, and a mass ratio of the polyisocyanate having a urethane bond and a urea bond in the self-emulsifying polyisocyanate composition and the base compound is 1:9 to 3:7.

11. A coating film obtainable from the two-part coating composition according to claim 8.

* * * * *